US012719810B2

(12) United States Patent
Ratcliff et al.

(10) Patent No.: US 12,719,810 B2
(45) Date of Patent: Aug. 25, 2026

(54) INTERRUPT HANDLING FOR RECEIVED NETWORK PACKETS

(71) Applicant: International Business Machines Corporation, Armonk, NY (US)

(72) Inventors: Bruce Ratcliff, Red Hook, NY (US); Dan Vangor, Mahopac, NY (US); Stephen R. Valley, Valatie, NY (US); Margaret Dubowsky, Poughkeepsie, NY (US); Francis Gassert, Monroe, NY (US); Jerry Stevens, Raleigh, NC (US); Richard P. Tarcza, Kingston, NY (US); Patricia G. Driever, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 18/512,647

(22) Filed: Nov. 17, 2023

(65) Prior Publication Data

US 2025/0168123 A1 May 22, 2025

(51) Int. Cl.
*H04L 47/50* (2022.01)
*H04L 69/22* (2022.01)

(52) U.S. Cl.
CPC .............. *H04L 47/50* (2013.01); *H04L 69/22* (2013.01)

(58) Field of Classification Search
CPC ................................ H04L 47/50; H04L 69/22
See application file for complete search history.

(56) References Cited

U.S. PATENT DOCUMENTS

| | | | |
|---|---|---|---|
| 6,519,645 | B2 | 2/2003 | Markos et al. |
| 7,089,457 | B2 | 8/2006 | Stevens |
| 8,055,817 | B2 | 11/2011 | Higgs et al. |
| 8,196,139 | B2 | 6/2012 | Easton et al. |

(Continued)

FOREIGN PATENT DOCUMENTS

| | | | |
|---|---|---|---|
| CN | 105432047 | A | 3/2016 |
| CN | 107003846 | A | 8/2017 |
| CN | 115004164 | A | 9/2022 |

OTHER PUBLICATIONS

International Searching Authority, "Notification of Transmittal of the International Search Report and the Written Opinion of the International Searching Authority, or Declaration," Patent Cooperation Treaty May 21, 2025, 07 pages, International Application No. PCT/ IB2024/060600.

*Primary Examiner* — Brandon J Miller
(74) *Attorney, Agent, or Firm* — Teddi Maranzano, Esq.; Rachel L. Pearlman, Esq.; Heslin Rothenberg Farley & Mesiti P.C.

(57) ABSTRACT

Embodiments herein describe techniques for providing interrupts from a shared network adapter to a host operating system or control program. A register can store an interrupt state of the host that indicates whether an interrupt is required. For example, the host may still be busy processed previous received data (e.g., a packet received from a network), which means no interrupt is required. When the host has processed each of the requests from the shared network adapter, the interrupt state in the register can be changed that if any additional data is received, an interrupt is required. Moreover, the register can include a bitmask to indicate which of a plurality of receive data queues has data ready for the host to process.

17 Claims, 12 Drawing Sheets

(56) References Cited

U.S. PATENT DOCUMENTS

| | | | | |
|---|---|---|---|---|
| 8,271,258 | B2 | 9/2012 | Chan et al. | |
| 8,819,393 | B2 | 8/2014 | Blandy et al. | |
| 8,918,559 | B2 | 12/2014 | Amann et al. | |
| 2015/0019781 | A1 | 1/2015 | Gomes | |
| 2019/0050253 | A1* | 2/2019 | Tourrilhes | G06F 9/4812 |
| 2020/0183732 | A1* | 6/2020 | Cornett | H04L 49/901 |
| 2021/0133212 | A1* | 5/2021 | Huang | G06F 16/258 |
| 2023/0072491 | A1* | 3/2023 | Dhoble | H04L 69/22 |

* cited by examiner

INTERRUPT HANDLING FOR RECEIVED NETWORK PACKETS

BACKGROUND

The present invention relates to interrupt handling, and more specifically, to a shared network adapter interrupting a host operating system.

A shared resource environment enables workloads executing within the environment, even those of different customers or different operating systems, to be consolidated on one machine allowing the resources of that machine to be shared.

One example of a shared resource is a shared network interface (e.g., a shared adapter), which facilitates communications with one or more hosts coupled to the shared network interface. The shared network interface facilitates the transfer of data, including large amounts of data, into or out of a host and the host's file system. It also facilitates the streaming of other types of large data, such as video or complex engineering or scientific graphics. Transferring large amounts of data, whether it be files, streams, or other data, can be very expensive in terms of central processing unit (CPU) cycles and the cost of the network input/output (I/O).

SUMMARY

According to one embodiment of the present invention, a method includes identifying, at a shared network adapter, data that should be processed by a host; storing the data in one of a plurality of receive (RX) data queues where the plurality of RX data queues facilitates data transfer between the shared network adapter and the host; setting a bitmask to indicate which RX data queue of a plurality of RX data queues stores the data; checking an interrupt state corresponding to the host; and determining whether to transmit an interrupt to the host to process the data based on the interrupt state.

According to one embodiment of the present invention, a system includes one or more processors configured to host a plurality of logical partitions or virtual machines; a shared network adapter configured to provide an interface between the plurality of logical partitions or virtual machines and a network interface card (NIC). The shared network adapter is configured to identify data that should be processed by the host, store the data in one of a plurality of receive (RX) data queues where the plurality of RX data queues facilitates data transfer between the shared network adapter and the host, set a bitmask to indicate which RX data queue of a plurality of RX data queues stores the data, check an interrupt state corresponding to the host, and determine whether to transmit an interrupt to the host to process the data based on the interrupt state.

According to one embodiment of the present invention, a computer program product includes a computer readable storage medium having computer readable program code embodied therewith, the computer readable program code executable by one or more computer processors to perform an operation. The operation includes identifying, at a shared network adapter, data that should be processed by a host; storing the data in one of a plurality of receive (RX) data queues where the plurality of RX data queues facilitates data transfer between the shared network adapter and the host; setting a bitmask to indicate which RX data queue of a plurality of RX data queues stores the data; checking an interrupt state corresponding to the host; and determining whether to transmit an interrupt to the host to process the data based on the interrupt state.

DETAILED DESCRIPTION

Figure 1:
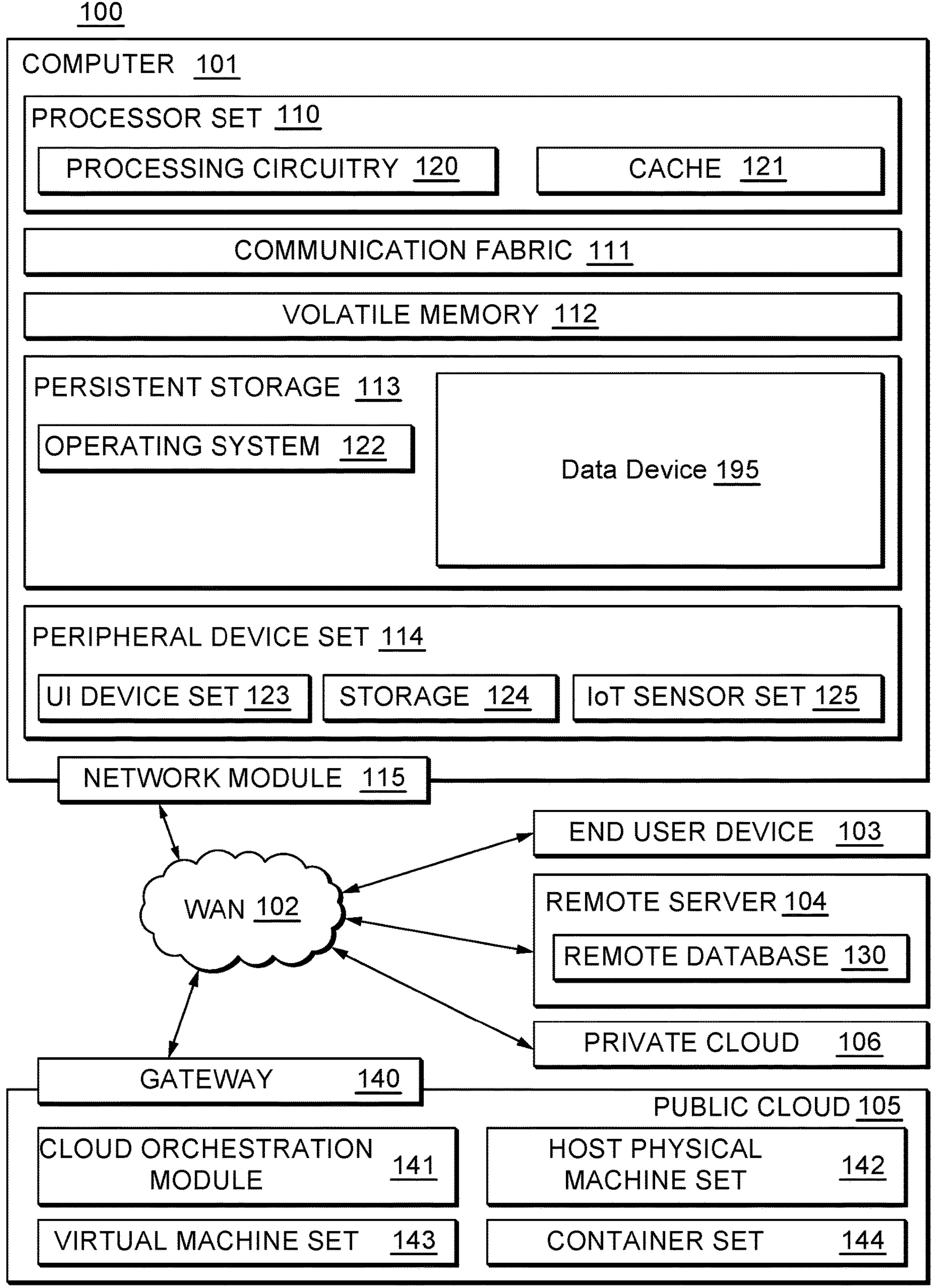
FIG. 1 illustrates a computing environment, according to one embodiment.

Embodiments herein describe techniques for providing interrupts from a shared network adapter to a host operating system (OS) or control program (CP). In one embodiment, an interrupt register is used to manage interrupts. This register can store an interrupt state of the host OS or CP that indicates whether an interrupt is required. For example, the host may still be busy processed previous received data (e.g., a packet received from a network), which means no interrupt is required. When the host has processed each of the requests from the shared network adapter, the interrupt state in the register can be changed that if any additional data is received, an interrupt is required. This advantageously reduces the amount of interrupts that the shared network adapter transmits to the host, which can save compute resources and power in the computing system.

In addition, the interrupt register can include a bitmask where each bit corresponds to a receive (RX) queue where the shared network adapter has stored RX data that should be processed by the host. The host can use the bitmask to identify which RX queues have data ready for it to process. Once done, the host can again evaluate the bitmask to see if the shared network adapter has saved more RX data in a different queue for the host to process. Advantageously, the bitmask can reduce the bandwidth used in the computing system for the shared network adapter to inform the host where RX data is stored.

The bitmask in the interrupt register can also include bits that correspond to transmit (TX) queues. A control program (CP) in the host can set an interrupt on a TX queue when the host operating system desires an interrupt when the shared network adapter processes a specific TX packet. The interrupt request is specified in a TX storage block page entry (SBPE) associated with a TX request.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as establish data constructs for a data device 195 which permits the OS 122 to communicate with a shared adapter interface (which is discussed in more detail in the later figures). In addition to the data device 195, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including OS 122 and data device 195, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary OSs or open source Portable Operating System Interface-type OSs that employ a kernel. The code included in the data device 195 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an OS feature in which the kernel allows the existence of multiple isolated user-space instances, called containers. These isolated user-space instances typically behave as real computers from the point of view of programs running in them. A computer program running on an ordinary OS can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
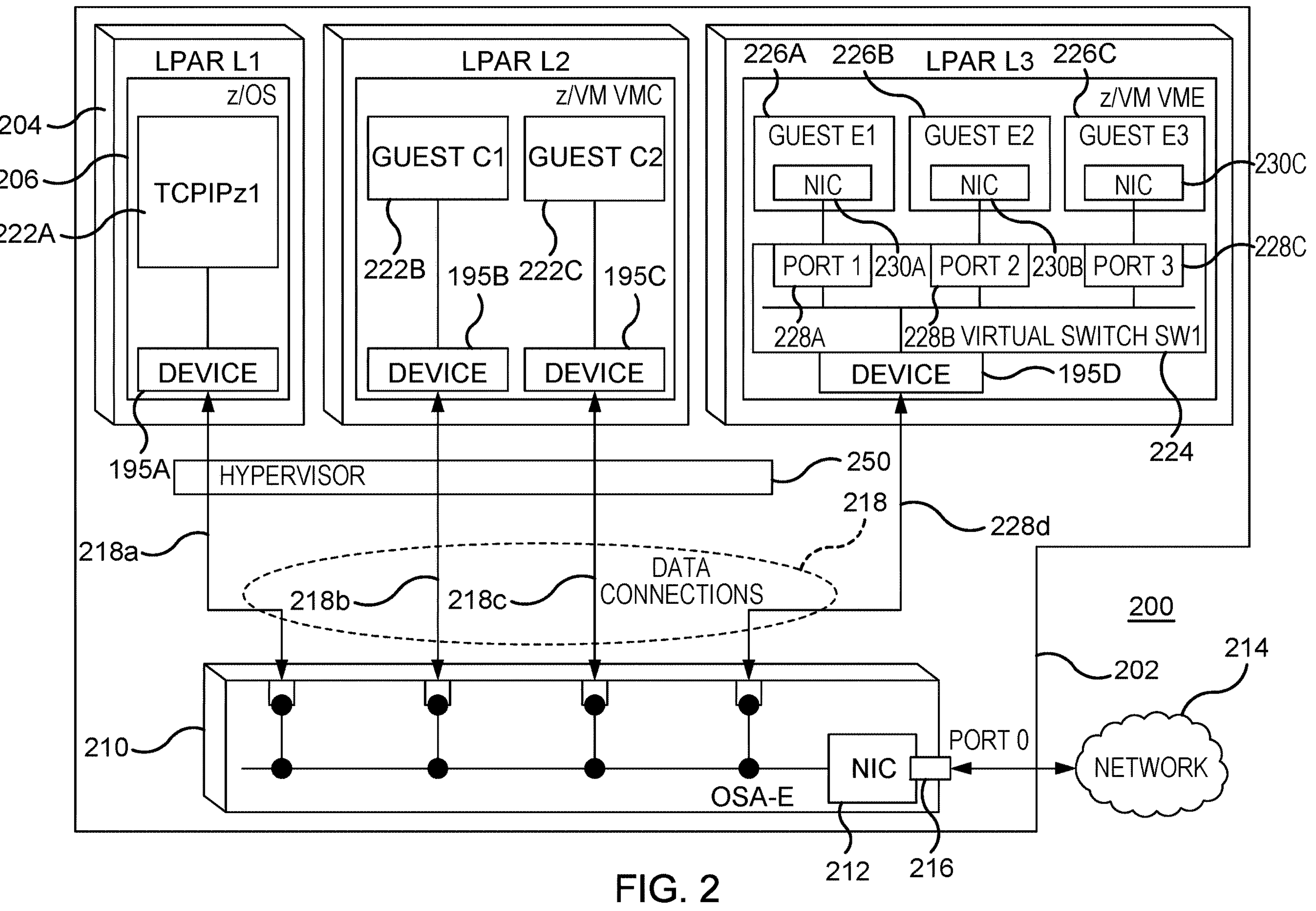
FIG. 2 illustrates a shared resource environment, according to one embodiment.

One embodiment of a shared resource environment to incorporate and use one or more aspects of the present invention is described with reference to FIG. 2. In one example, a shared resource environment 200 is based, for instance, on the z/Architecture® offered by International Business Machines Corporation, Armonk, N.Y., and includes, for instance, a System Z® server, also offered by International Business Machines Corporation. z/Architecture®, System Z® and IBM® are registered trademarks of International Business Machines Corporation, Armonk, N.Y., U.S.A. Other names used herein may be registered trademarks, trademarks or product names of International Business Machines Corporation or other companies. While the z/Architecture® and System Z® are used as illustrative examples, the embodiments herein are not limited to this architecture and can be applied to any suitable hardware system and OS as described in FIG. 1. For example, the embodiments herein can be applied to any computing system where multiple entities (e.g., LPARs or virtual machines (VM)) share a common adapter 210.

In this example, shared resource environment 200 includes a central processor complex (CPC) 202, having, for instance, one or more partitions or zones 204 (e.g., logical partitions LPAR L1-LPAR L3, which can also be referred to as VMs). Each logical partition has a resident OS 206, which may differ for one or more of the logical partitions. That is, the OSs 206 may be different types of OSs. Although in this example, three logical partitions are described, other embodiments can include more or fewer logical partitions. Further, one or more of the partitions may not be executing an OS, and/or may execute OSs other than those described herein. Moreover, one LPAR or VM can have multiple OSs.

One or more of the logical partitions are managed by a hypervisor 250. The hypervisor 250 enables the hardware to virtualize the LPARs.

Each LPAR is coupled to a shared network adapter 210. The adapter 210 includes a network interface card/controller (NIC) 212, which enables communication via an external network 214. External network 214 is coupled to the NIC 212 via a port 216. The network 214 may be used to communicate between the LAPRs of the shared resource environment 200 or with processors of other processing environments over a local area network (LAN) or wide area network (WAN).

The adapter 210 can include software code (e.g., microcode) that communicates with the OSs in the LPARs. Put differently, this code provides an interface to communicate between the LPARs and the rest of the components in the adapter 210 (e.g., the NIC 212). As discussed in more detail below, the LPARs also have data devices 195A-195C which serve as interfaces between a respective OS in the LPARs and the shared network adapter 210. While FIG. 2 illustrates each LPAR having one data device 195, a LPAR (or an OS in the LPAR) can have multiple data devices 195 (e.g., one data device 195 dedicated to IPv4 traffic and another data device 195 dedicated to IPv6 traffic).

The adapter 210 also includes a plurality of data connections 218, each of which is coupled to one of the devices 195 within an LPAR. For instance, a data connection 218A is coupled to a data device 195A in LPAR 1; data connections 218B, 218C are coupled to data devices 195B, 195C, respectively, in LPAR 2; and a data connection 218D is coupled to a device 195D in LPAR 3. In one example, the data connections 218 are enhanced queued direct I/O (EQ- DIO) data connections. Further, the data connections 218 can be used to transmit both data for user applications as well as control data.

The device 195A is further coupled to an entity 222A (such as TCP/IP, the protocol stack for OS) in LPAR 1; data devices 195B, 195C are further coupled to entities 222B, 222C (such as Guest C1, Guest C2), respectively, in LPAR 2; and device 195D is further coupled to a virtual switch 224 in LPAR 3.

The virtual switch 224 enables further sharing of data among entities 226A, 226B and 226C (e.g., Guest E1, E2 and E3) of LPAR 3. The virtual switch 224 includes a plurality of ports 228A, 228B and 228C, each of which is coupled to a respective guest via a NIC 230A, 230B, and 230C, respectively. The virtual switch allows the guests coupled thereto to communicate with one another without using the adapter or the external network.

Figure 3:
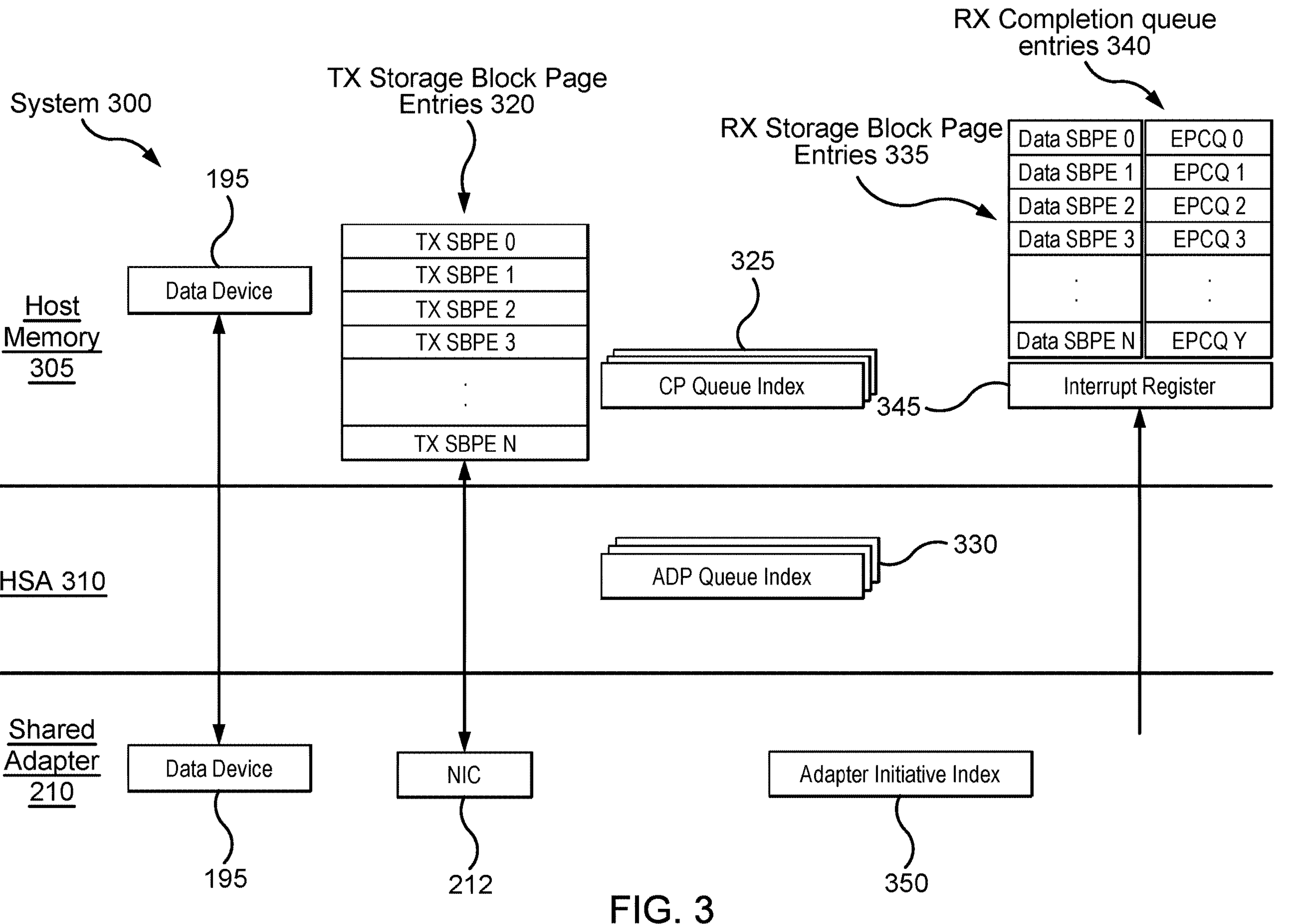
FIG. 3 illustrates data constructs for a data device, according to one embodiment.

FIG. 3 illustrates data constructs for a data device, according to one embodiment. The system 300 illustrates data constructs in host memory 305, hardware system area (HSA) 310, and the shared adapter 210. The host memory 305 can be the memory in the LPARs or VMs, while the shared adapter 210 can include code (e.g., microcode) and memory that serves as an interface between the NIC 212 and the LPARs (e.g., the hosts).

The data constructs in the host memory 305 include the data device 195 (which is also established in the shared adapter 210 in a process described in later figures), TX storage block page entries (SBPE) 320, a control program (CP) queue index 325, RX SBPEs 335, an RX completion queue 340, and an interrupt register 345. As discussed above, the data device 195 establishes the connection between the host and the shared adapter 210. Each LPAR (or each OS in the LPAR) that wishes to use the NIC 212 may create its own data device 195. The data device 195 can include any number of data queues that rely on the data constructs illustrated in FIG. 3 to facilitate communication between the host and the shared adapter 210. For example, there can be a configurable number of Data Queues which can be any mix of TX or RX Queues. In one embodiment, there is at least one Data Plane TX and one Data Plane RX queue. In addition, the data device 195 includes at least one pair of control queues (i.e., one Control Plane TX queue and one Control Plane RX queue).

The format of the TX SBPEs 320 and the RX SBPEs 335 will be discussed in more detail in FIGS. 7A and 7B, but in general, these entries contain pointers to packets that are being transmitted from the host (in the case of TX SBPEs 320) to the network via the NIC 212 or pointers to packets that are received at the NIC 212 from the network (in the case of RX SBPEs 335). The TX SBPEs 320 can also contain pointers to control information which is used to pass configuration or debug types of information between the Host and the shared adapter 210. Each SBPE can indicate that the packet is stored in one location, or that the packet is stored in multiple different locations (e.g., the headers may be stored in one location, while the payload is stored in another location). Thus, the pointers in the SBPEs 320 and 335 can support either type of strategy for storing the TX and RX packets in memory. Note that in one embodiment, the SBPEs themselves can store the TX and RX packets, rather than having pointers to those packets.

The CP queue index 325 can indicate the number of TX SBPEs 320 that are ready to be processed by the shared adapter 210. For example, assume that the host has four packets it wants the NIC 212 to send on the network 214. The host can create four TX SBPEs 320 (e.g., TXSBPE 0-3) for those four packets and then update the CP queue index 325 to inform the shared adapter 210 that the host has four packets ready to be transmitted. The shared adapter 210 can then read the CP queue index 325, identify the four TX SBPEs 320, and fetch the packets to be transmitted by the NIC 212 using the information in the four TX SBPEs 320. More details of the CP queue index 325 are provided in FIG. 8.

In one embodiment, each TX queue and RX queue include its own CP queue index 325 and adapter (ADP) ADP queue index 330.

The RX completion queue 340 map locations of Ethernet packets in an RX Data Buffer. In one embodiment, the shared adapter 210 uses the completion queue 340 to indicate new RX packet arrivals at the NIC 212. The details of the RX completion queue 340 are provided in FIG. 9.

The interrupt register 345 is set by the shared adapter 210 when an interrupt is generated. In one embodiment, the register 345 includes an interrupt state (e.g., one byte) which the host can set to indicate when an interrupt is required. For example, if the host has finished processing all the received packets, the CP in the host can set the interrupt state to indicate it is idle. Thus, if the shared adapter 210 receives additional packets, it can use the interrupt state to determine whether it should then send an interrupt to the host. For example, if the interrupt state indicates that the host is not currently processing data in the RX queues, then the shared adapter 210 can send an interrupt to the host. However, if the interrupt state indicates the host is currently processing RX packets, an interrupt is not needed.

Moreover, in one embodiment, the register 345 can include a bitmask where each bit corresponds to a queue ID of a queue in the data device. The shared adapter 210 can use the bitmask to indicate which queues has data ready to be processed by the host. While there may be multiple queues for the data device 195, there may be only one interrupt register 345 for each data device 195.

The HSA 210 is a special memory area used for Hardware Configuration tables. In this example, the HSA 310 includes the ADP queue index 330. In one embodiment, the ADP queue index 330 is read/write by the adapter 210, and read only by the CP. The shared adapter 210 updates the ADP Queue Index 330. The TX ADP Queue Index is used by the adapter to indicate the completion of a control plane request or the completion of a packet transmission. Although FIG. 3 illustrates one ADP queue index 330, in one embodiment, the HSA 310 may store a TX ADP queue index and an RX ADP queue index. During transmission, the shared adapter 210 gets TX completions and updates the TX ADP queue index. As such, the TX ADP queue index 330 can store the next TX SBPE Index to be consumed by the shared adapter 210. Moreover, updates by the shared adapter 210 to the ADP queue index 330 can be used to indicate the completion of TX Control or Data requests. The CP Queue Index 325 indicates the next entry which will contain a new TX Control or Data request.

For an RX ADP queue index, the shared adapter 210 updates this index to describe received packets. The index can indicate the next RX data SBPE 335 to be consumed by the adapter 210 and the next RX completion queue entry 340 to be produced by the adapter 210. The Data SBPE Index is updated when the adapter 210 has used all allocated space in a Data SBPE and ownership of the buffer space is returned to the CP.

In addition to the data device 195 and the NIC 212, the shared adapter 210 also includes an adapter initiative index 350. This data construct can be used by the host to interrupt or wake up the shared adapter 210 when the host has packets ready to be transmitted. The shared adapter 210 can use the CP queue index 325 to retrieve the TX SBPEs 320 and programs the NIC to fetch the correspond TX packets from host memory 305 using the pointers in the TX SBPEs 320. When the adapter initiative index 350 is used, the CP copies the contents of the CP queue index 325 into the adapter initiative index 350. The adapter 210 can then directly fetch the SBPEs corresponding to the Queue Index without fetching the CP queue index 325.

Figure 4:
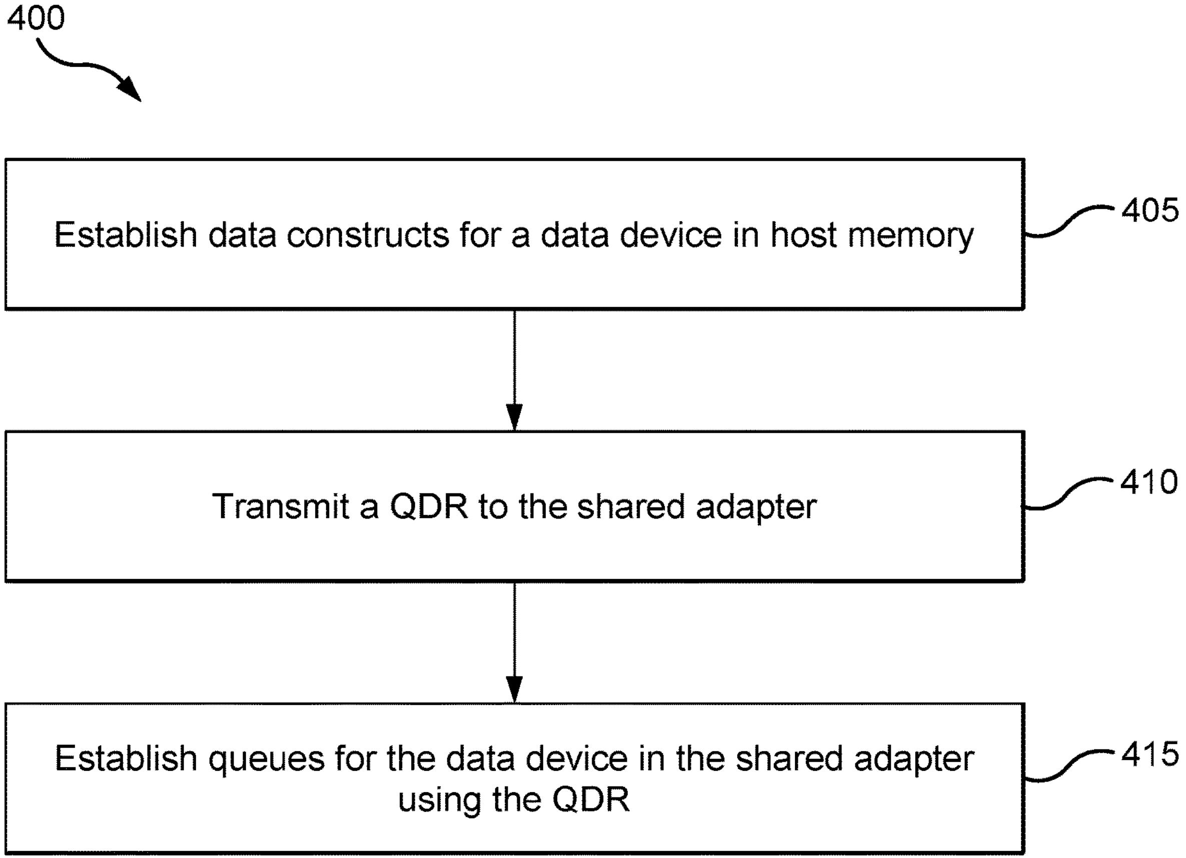
FIG. 4 is a flowchart for establishing data constructs for a data device, according to one embodiment.

FIG. 4 is a flowchart of a method 400 for establishing data constructs for a data device, according to one embodiment. For example, the method 400 can configure the shared adapter to use the various data constructs illustrated in FIG. 3.

At block 405, the host establishes data constructs for the data device in host memory. These data constructs can include, for example, the TX SBPEs 320, the CP queue index 325, the RX SBPEs 335, the RX completion queue entries 340, and the interrupt register 345.

Figure 5:
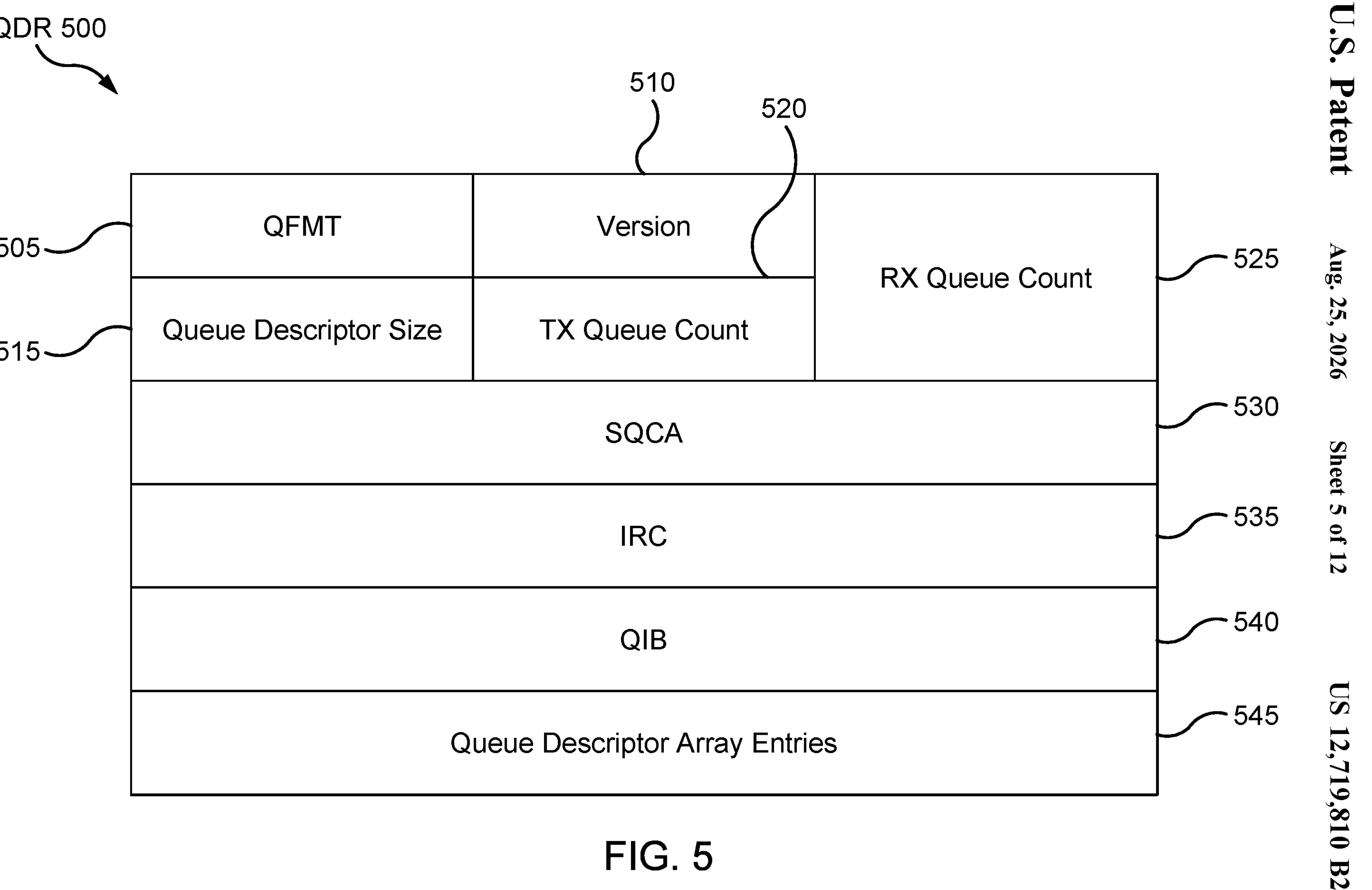
FIG. 5 illustrates a queue description record, according to one embodiment.

At block 410, the host transmits a queue description record (QDR) to the shared adapter 210. One example of a QDR is illustrated in FIG. 5. For example, the host may use a different I/O protocol to communicate with the shared adapter before the control plane and data plane have been established. One example I/O protocol can be channel command word (CCW), which defines I/O operations used for communications with a channel subsystem. The CCW contains a channel command, such as read, write, or control, along with the data address of the data area involved. However, the embodiments herein are not limited to any particular I/O protocol so long as that protocol can transmit the QDR to the shared adapter.

At block 415, the shared adapter establishes TX and RX queues for the data service in the shared adapter using the QDR. In one embodiment, the shared adapter first establishes TX and RX control queues for establishing the control plane, and then establish TX and RX data queues for the data plane, after the control plane has been establish.

The information used to establish the control and data queues is described using FIG. 5 as an example. The QDR 500 in FIG. 5 includes a QFMT 505, a version 510, a queue descriptor size 515, TX queue count 520, RX queue count 525, a system queue control area (SQCA) 530, an interrupt reduction control (IRC) 535 (also referred to as simply "interrupt control"), queue information block (QIB) 540, and queue descriptor array entries 545.

The Queue Format (QFMT) 505 enables the use of multiple protocols, each using a specific format for their SBPEs, CP and ADP Queue Index areas, Interrupt Register, etc.

The version 510 enables the support for multiple versions of a specific QFMT. For example, Version 2 might support an expanded format of the SBPEs which is not supported in Version 1.

The queue descriptor size 515 tells the shared adapter 210 the size of the queue descriptor array entries 545.

The TX queue count 520 tells the shared adapter 210 how many TX queues the data device has. In one embodiment, the QDR contains a Queue Descriptor Entry for each of the Control Queues and each of the Data Queues. For example, the RX Control Queue can be hardcoded as Queue ID 0 and the TX Control Queue as Queue ID 1.

As for Data Queues, the data device may have multiple TX queues where each queue can have a different priority. For example, for each pass, the shared adapter may only process at most 5 packets for one TX queue (even if it has more packets than that) but may process up to 10 packets for another, higher priority, TX queue in the data device.

The RX queue count 525 tells the shared adapter 210 how many RX queues the data device has, which can include a RX control queue and any number of RX data queues. Like the TX queues, the data device may include multiple RX data queues which may be assigned different priorities. The host may process the received packets differently depending on which RX queue they are in. One other use for multiple RX queues is the host can configure a specific RX queue for a special traffic type (e.g., ARP) therefore enabling the host to attach a special program specifically designed for that traffic type.

The SQCA 530 contains the address for the CP queue index 325 in host memory 305 in FIG. 3. That is, the SQCA 530 contains the memory address of the CP queue index 325 so that the shared adapter 210 can read the index 325 to determine which of the TX SBPEs 320 in host memory 305 correspond to new TX packets. In one embodiment, each TX queue in the data device has its own set of TX SBPEs 320. As such, each TX queue can also have its own CP queue index 325. The SQCA 530 can contain the address of each CP queue index for the data device. In one embodiment, the SQCA 530 is a 256 byte area and each queue has a defined SQCA. For example, the first 8 bytes of the SQCA 530 is the Queue Index area associated with the defined queue. The SQCA Address in the QDR can be a pointer to a 4K Memory Area which contains 16 SQCAs. The QDR contains two of these pointers to represent a total of 32 possible queues (16 in each 4K page.)

In some embodiments, the QDR 500 may include multiple SQCAs 530 if a predefined data size (e.g., 64 bits) is not sufficient to store the addresses for each CP queue index (e.g., if the data drive has a bunch of TX queues).

The IRC 535 stores the memory address of the interrupt register 345 in the host memory 305 in FIG. 3. That way, the shared adapter 210 can query this register 345 so it can interrupt the host when there are new received packets ready for it to process as discussed above.

The QIB 540 informs the shared adapter 210 of the properties of the queues in the data device. The QIB 540 can contain information which is global to all queues. This may include things like the Host and Adapter Capabilities. The Host capabilities contain, e.g., the Cache Line size. The Adapter Capabilities can be protocol offloads, LAN speed, link aggregation functionality, etc.

In this example, the queue descriptor array entries 545 can include different amounts of data (e.g., have a varying size) which is why the QDR 500 includes the queue descriptor size 515. The details of the queue descriptor array entries 545 are described in FIG. 6.

Figure 6:
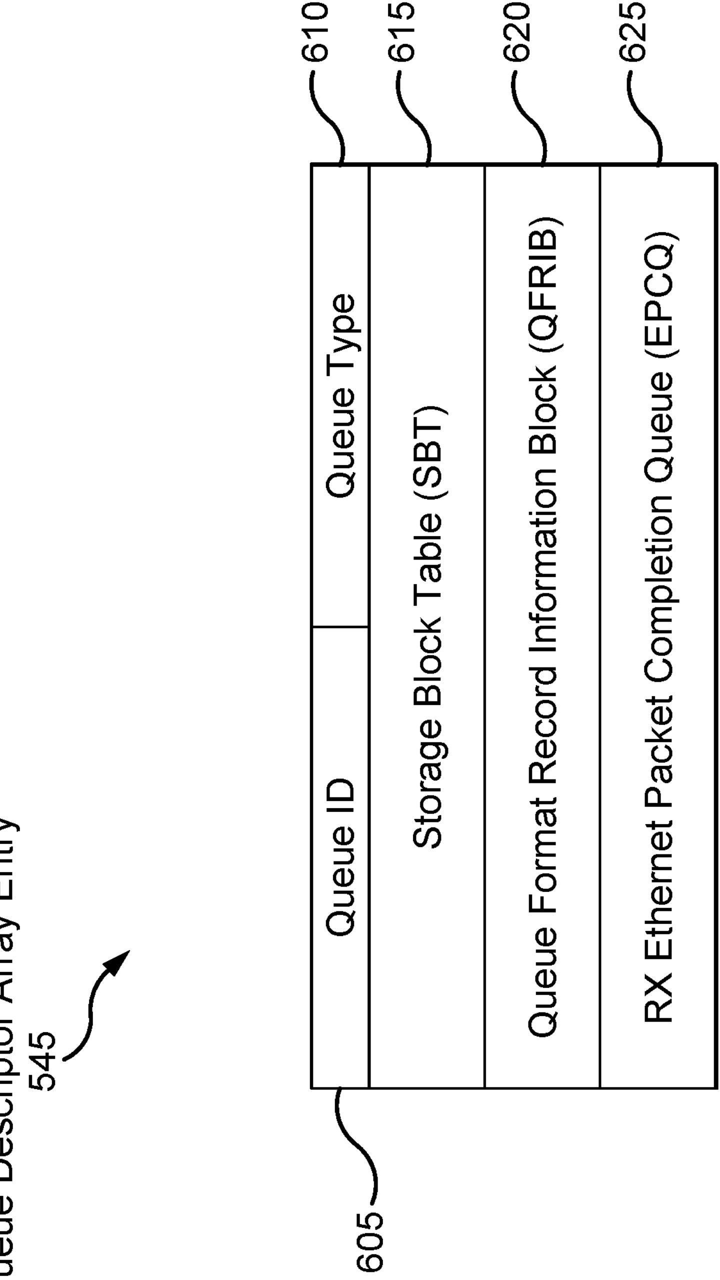
FIG. 6 illustrates a queue descriptor array entry, according to one embodiment.

FIG. 6 illustrates a queue descriptor array entry 545 in a QDR (e.g., the QDR 500 in FIG. 5). In this example, the queue descriptor array entry 545 includes a queue ID 605 to identify the specific queue in the data device that corresponds to the entry 545 and a queue type 610 indicating whether the corresponding queue is a control queue, a RX queue, or TX queue, etc.

The queue descriptor array entry 545 also includes a Storage Block Table (SBT) 615, a Queue Format Record Information Block (QFRIB) 620, and a RX Ethernet Packet Completion Queue (EPCQ) 625.

The SBT 615 stores an address that maps the TX SBPEs or RX data SBPEs corresponding to the queue to locations in host memory. That way, the shared adapter 210 knows where in host memory the TX SBPEs 320 or RX data SBPEs 335 are located.

The QFRIB 620 stores an address that contain specific configuration information for the TX or RX queue type.

The RX EPCQ 625 stores an address that maps to the location of the RX completion queue entries 340. That way, the shared adapter 210 knows where in host memory the RX complete queue entries 340 are located.

In this manner, the QDR 500 in FIG. 5 (which can include the queue descriptor array entry 545 in FIG. 6) can be transmitted by the host to the shared adapter 210 so the shared adapter 210 can use the data constructs established by the host for the data device. That is, the shared adapter 210 can use the information in the QDR 500 to establish the TX and RX queues that permit the LPARs and the NIC to communicate.

Figures 7A, 7B:
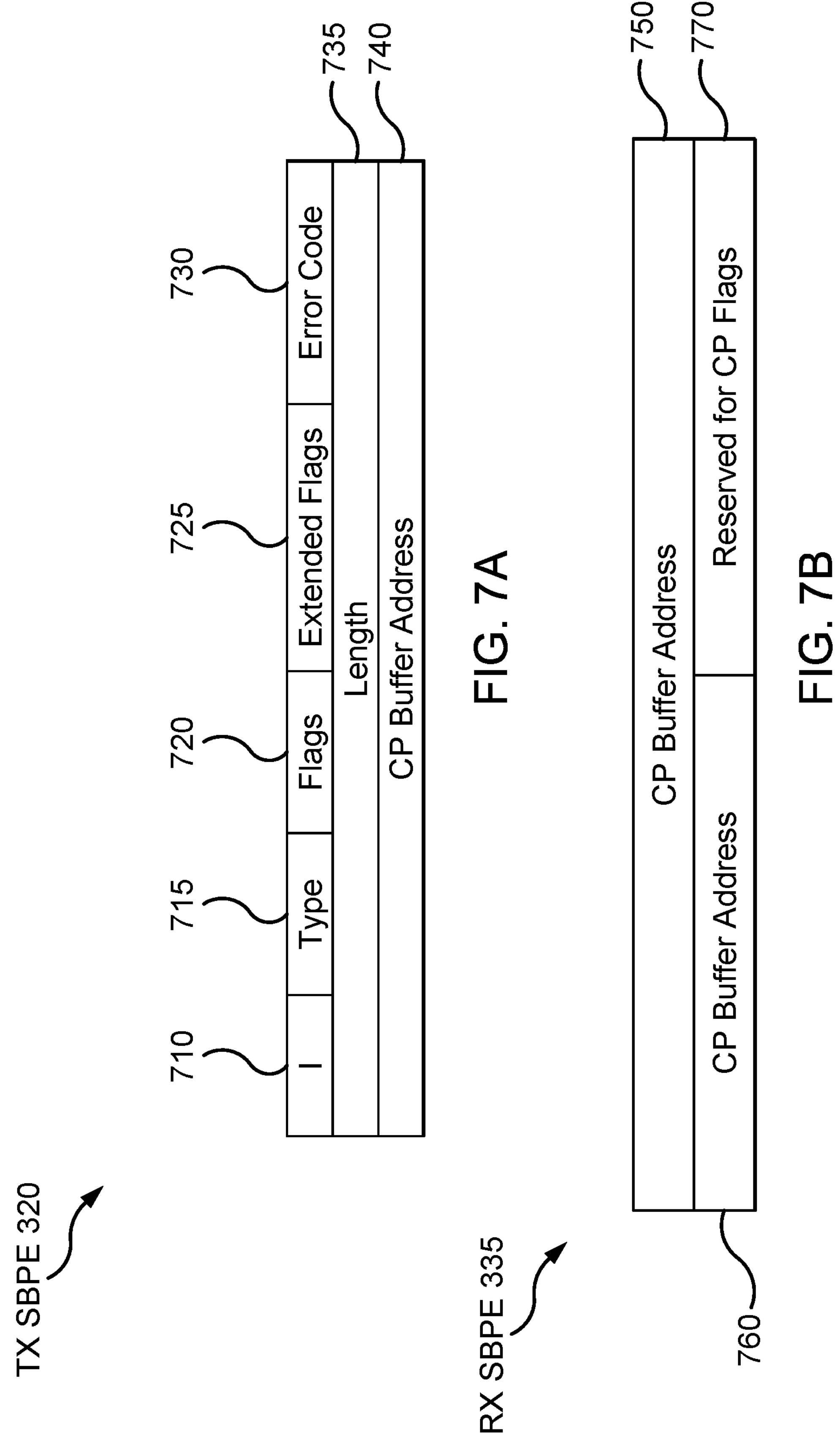
FIGS. 7A and 7B illustrate TX and RX storage block page entries, according to one embodiment.

FIG. 7A illustrates a TX SBPE 320, according to one embodiment. That is, FIG. 7A is one example of a TX SBPE 320 discussed above. As shown, the SBPE 320 includes an R bit 705, an I bit 710, a type 715, flags 720, extended flags 725, error code 730, length 735, and CP buffer address 740.

The I bit 710 identifies whether the packet represented by the SBPE 320 is immediate data where the SBPE stores the TX packet rather than storing a pointer to TX packet. This may be valid only for the data plane, and not for the control plane.

The type 715 identifies data type of the corresponding packet, such as 0x01 control packet or a 0x02 Ethernet packet, etc.

The flags 720 can be a chaining flag to "chain" together multiple SBPEs where the data packet is stored in different memory locations or indicate the packet is stored in contiguous memory locations. The flags 720 may indicate that an interrupt should be generated by the shared adapter when processing the corresponding packet. The flags 720 may also include an error flag, where the error code 730 can contain the specific error code.

The extended flags 725 can be reserved for use by the CP executing in the host.

The length 735 indicates the length of the Control Information or Data pointed to by the Buffer Address in the TX SBPE.

In one embodiment, the CP buffer address 740 supports any byte aligned address. However, the buffer address 740 may be restricted where the buffer address 740 plus the length 735 cannot cross a 4K boundary, and instead should use chaining in that instance.

FIG. 7B illustrates a RX SBPE, according to one embodiment. That is, FIG. 7B is one example of a RX SBPE 335 as introduced in FIG. 3. As shown, the SBPE 335 includes a CP buffer address 750, a CP buffer address extender 760, and a reservation for CP flags 770.

The CP buffer address 750 and the (optional) CP buffer address extender 760 can store a 64 bit CP buffer address. For example, bits 0:31 of the address may be stored in the CP buffer address 750 while the remaining 32:63 bits of the address are stored in the CP buffer address extender 760.

In one embodiment, the low order bits (e.g., 12 of the lowest order bits) are reserved for CP flags. Reserving the low order bits forces the address in the SPBE to be 4K aligned. This is used to align the addresses with the Memory Page allocation algorithm which allocates memory in 4K blocks.

Figures 8, 9:
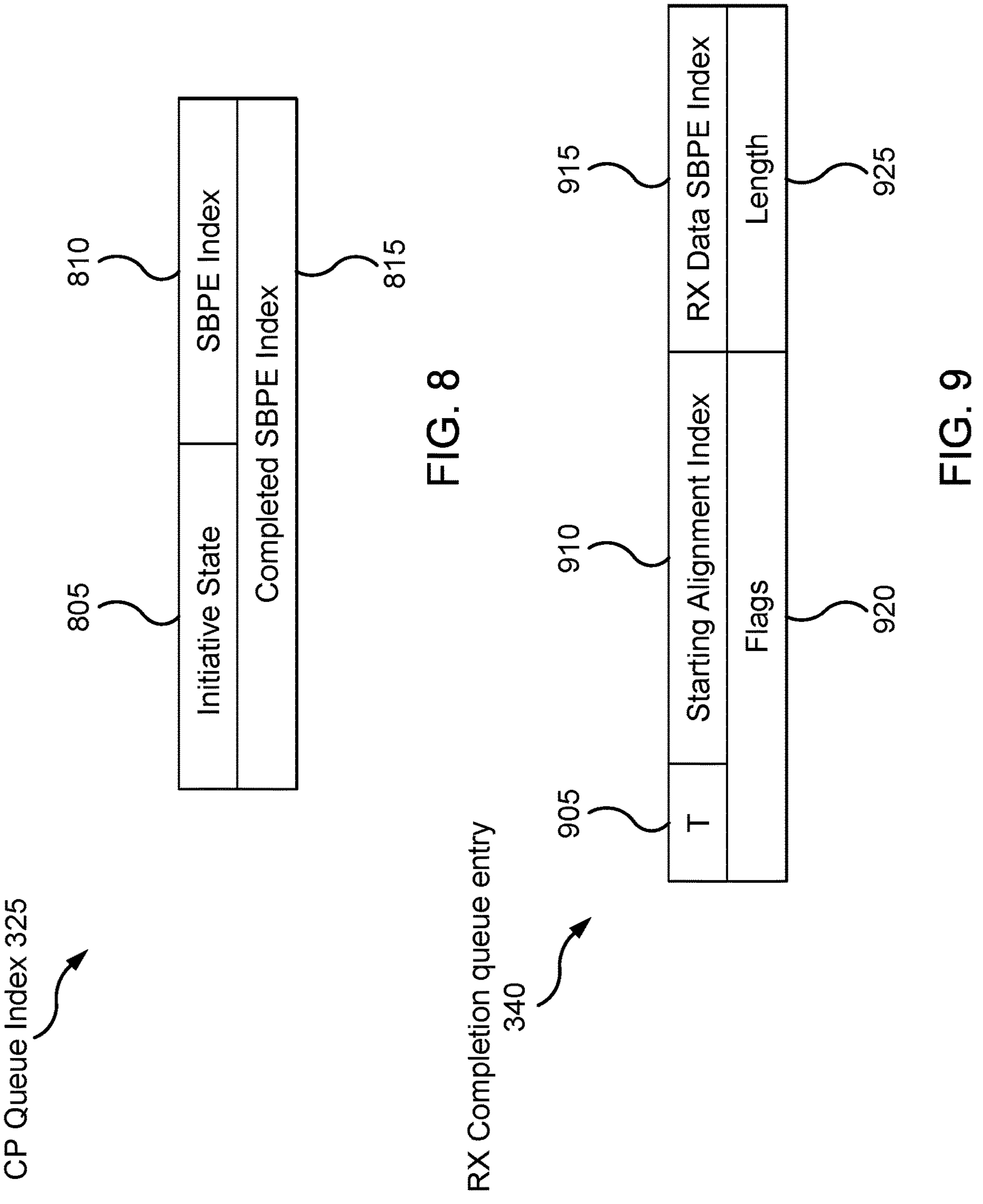
FIG. 8 illustrates a control program queue index, according to one embodiment.
FIG. 9 illustrates a RX completion queue entry, according to one embodiment.

FIG. 8 illustrates a CP queue index 325, according to one embodiment. The CP queue index 325 can indicate the number of TX SBPEs 320 that are ready to be processed by the shared adapter 210. The index 325 includes an initiative state 805, a SBPE index 810, and a completed SBPE index 815.

The initiative state 805 can tell the host whether the shared adapter is busy processing the TX SBPEs 320. That is, when a shared adapter is currently processing the TX SBPEs, it can update the initiative state 805 so the host (e.g., LPAR) knows that the shared adapter is currently processing the TX SBPEs. Thus, if the host has more packets ready to transmit (e.g., creates additional TX SBPEs 32), the host can query the initiative state 805, determine the shared adapter is currently processing other TX packets, and know it does not need to alert the adapter. When done processing the TX packets (i.e., the when the shared adapter has completed all outstanding work), the shared adapter can update the initiative state 805 to indicate it is done. Later, if the host has more TX packets to process, it can query the initiative state 805. If the state 805 indicates the shared adapter 210 is idle, the host updates the initiative state 805 as it posts the new work and interrupts the shared adapter 210 so the adapter 210 knows that more TX packets are ready to be sent.

The SBPE index 810 can be updated to initiate data transfer from the host to the shared adapter. The completed SBPE index 815 is updated to indicate the SBPEs that have been completed by the host and are ready to be processed by the shared adapter. For example, if the host filled in TX SBPEs 0-3, the host can update the competed SBPE index 815 to say "four" indicating that the host was filled in SBPEs 0-3 and SBPE 4 is the next SBPE the host will use. This tells the shared adapter 210 that SBPEs 0-3 are ready to be processed. Once the CP SBPE Index is updated, it transfers ownership of the TX SBPE(s) to the shared adapter. At this point, the TX SBPE(s) becomes read only to the CP.

In one embodiment, the host can also include a RX CP queue index. That is, while FIG. 8 illustrates a TX CP queue index, a RX CP queue index can be used that includes an initiative state, a data SBPE index which is updated to allocate RX buffers, and a EPCQ SBPE index which is updated by the host to acknowledge RX packets. In one embodiment, the Initiative State in both the CP TX and RX Queue Index areas works exactly the same. The initiative states can tell the CP whenever the indexes are updated and if the shared network adapter needs initiative (e.g., if the shared adapter should be interrupted). For the CP RX Queue Index, the shared network adapter can periodically check for new Data SBPEs and EPCQs. In one example, the shared network adapter only sets the Initiative State to indicate initiative is required when one of these resources becomes unavailable. This prevents the shared network adapter from having to poll these areas.

FIG. 9 illustrates a RX completion queue entry, according to one embodiment. The RX completion queue entry 340 maps locations of Ethernet packet in an RX Data Buffer. The entry 340 includes a T bit 905, a starting alignment index 910, an RX data SBPE index 915, flags 920, and a length 925.

The T bit 905 is a toggle bit which will be toggled by the shared network adapter each time the EPCQ wraps. This bit can be used by the CP to detect new work without having to access the ADP RX Queue Index area.

The starting Alignment Index 910 identifies a packet's starting location within a RX Buffer in specified alignment units (e.g., 256 bytes). In one embodiment, the alignment index alignment unit is based on the CP Cache line size. This can be a programmable value controlled by the QIB.

The RX Data SBPE Index 915 contains the SBPE Index associated with the RX Storage Block Page Entries 335 where the Ethernet packet was placed.

The flags 920 can contain error and Ethernet packet type flags.

The length 925 can specify the actual Ethernet frame length from a NIC RX Descriptor. This enables the CP to know the actual size of the Ethernet packet provided by the NIC.

In one embodiment, each EPCQ entry represents a specific Ethernet packet arrival.

Figure 10:
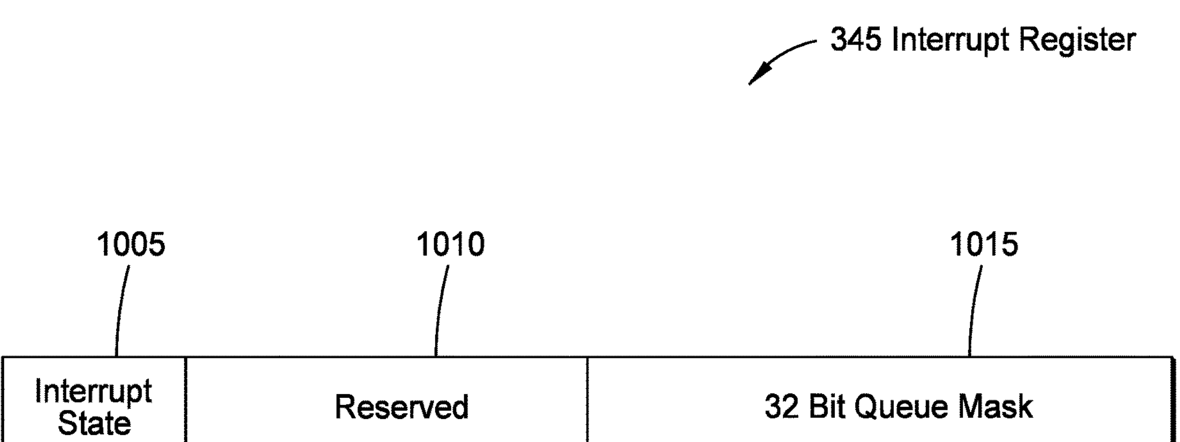
FIG. 10 illustrates an interrupt register, according to one embodiment.

FIG. 10 illustrates an interrupt register 345, according to one embodiment. As mentioned above, the interrupt register 345 can be modified by the shared adapter 210 when an interrupt is generated. As shown, the register 345 includes an interrupt state 1005 (e.g., one byte or one bit) which the host and the shared adapter can set to indicate when an interrupt is required. For example, if the host has finished processing the received packets, the CP in the host can set the interrupt state 1005 to indicate it is idle. Put differently, the host is no longer actively processing received packets and has moved on to other tasks. As such, the CP can set the interrupt state 1005 to "Interrupt Required" to indicate to the shared network adapter 210 that a new interrupt should be sent to the host when it has received a new packet from the network. Thus, if the shared adapter 210 receives additional packets, it can use the interrupt state 1005 to determine whether it should then send an interrupt to the host. For example, if the interrupt state 1005 is set to "Interrupt Required" indicating that the host is not currently processing data in the RX queues, then the shared adapter 210 sends an interrupt to the host.

In one embodiment, the host sets the interrupt state 1005 to "Interrupt Required" and the shared network adapter set the interrupt state 1005 to "No Interrupt Required". In one embodiment, the shared network adapter never sets the state 1005 to "Interrupt Required", but under certain circumstances it may be possible for the host to change the state 1005 from "Interrupt Required" to "No Interrupt Required".

Alternatively, the interrupt state 1005 may be set to "No Interrupt Required" indicating the host is current processing packets (or other received data) in response to a previous interrupt sent by the shared adapter. Thus, when the shared adapter stores a new received packet into a RX data queue, the shared adapter knows it should not send another interrupt to the host. Put differently, it is the responsibility of the host to see if additional packets have been stored in the RX queues before it changes the interrupt state 1005 from "No Interrupt Required" to "Interrupt Required." That way, the shared adapter can continue to store new packets into the RX queues while the host is currently processing other new packets without having to send new interrupts.

Moreover, to help the host track when new packets are stored in the RX queues and TX queues, the register 345 includes a bitmask 1015 where each bit corresponds to a queue ID of a RX queue or a TX queue in the data device. The shared adapter 210 can use the bitmask 1015 to indicate which queues has data ready to be processed by the host. For example, assume the interrupt state 1005 is currently "Interrupt Required." The shared adapter then loads a packet into a RX data queue and toggles the bit value in the bitmask 1015 corresponding to that queue from a logical 0 to a logical 1. The shared adapter interrupts the host which then uses the bitmask 1015 to identify the RX queue that contains the packet and changes the interrupt state 1005 to "No Interrupt Required." While processing the packet, the shared adapter can store another received packet in a second RX data queue and toggle the bit in the bitmask 1015 corresponding to that RX queue. However, because the interrupt state 1005 is set to "No Interrupt Required," the shared adapter does not send an interrupt to the host. After the host is done processing the first packet, it can toggle the bit from 1 back to 0 in the bitmask 1015. The host then checks the bitmask 1015 and sees that another bit has been toggled from 0 to 1, and begin to process the second packet stored in the corresponding RX queue. Once the host has finished processing the second packet, it toggles the corresponding bit from 1 back to 0. Assuming the shared adapter has not stored anymore received packets in the RX queues, each bit in the bitmask 1015 is a zero, which means the host is done processing the packets. The CP can then change the interrupt state 1005 to "Interrupt Required" and the host can perform other tasks while it waits for the NIC and the shared adapter to received additional packets.

While there may be multiple RX queues for the data device, there may be only one interrupt register 345 for each data device.

Moreover, the register 345 can include reserved bits 1010 which can be used to expand the functions of the register 345 in later updates or releases.

Figure 11:
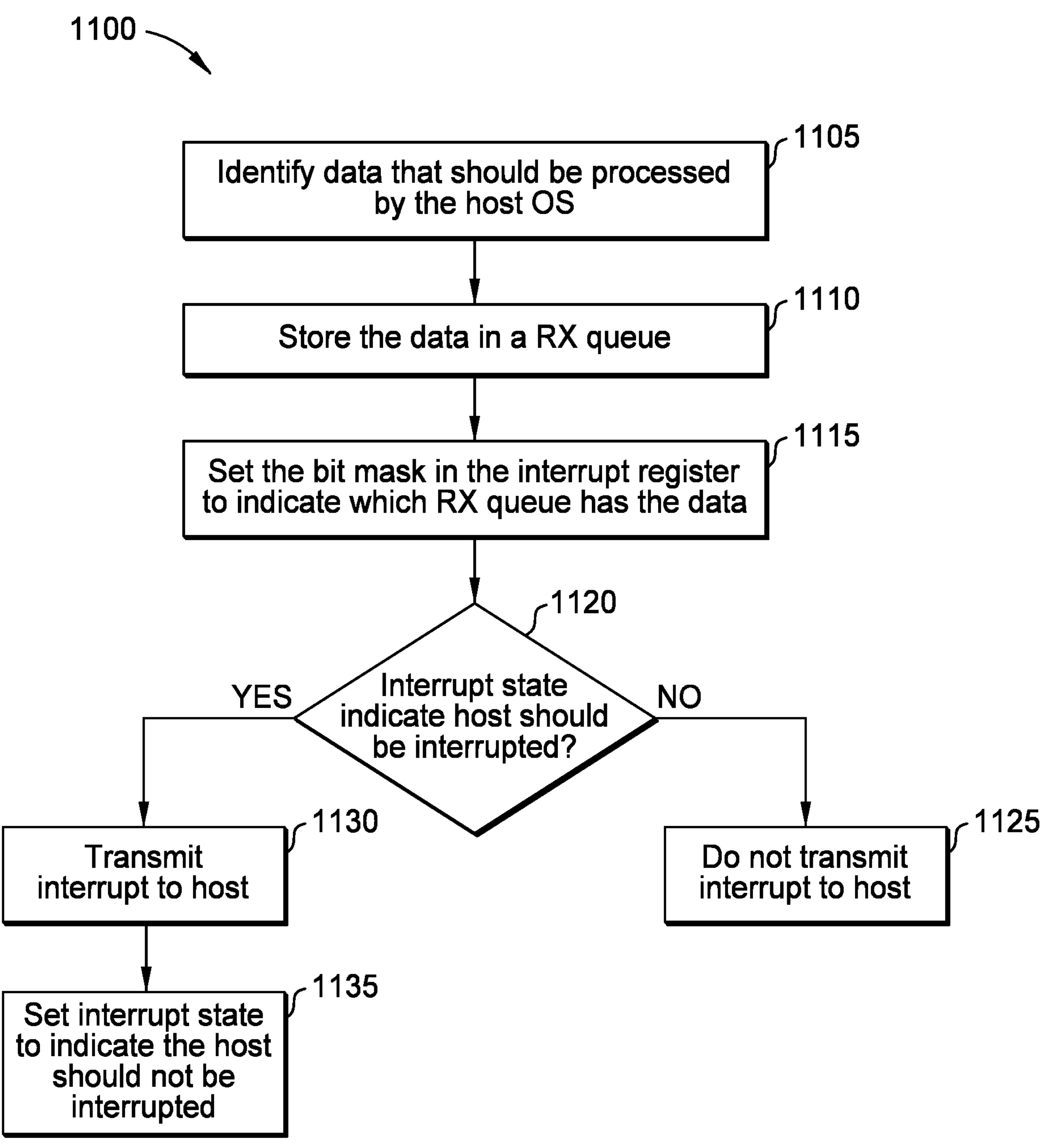
FIG. 11 illustrates a flowchart for interrupting a host operating system, according to one embodiment.

FIG. 11 illustrates a flowchart of a method 1100 for interrupting a host OS, according to one embodiment. At block 1105, the shared adapter identifies data that should be processed by the host (e.g., the OS in the host). This data can be a packet that was received by the NIC from a network (e.g., a local network or the Internet), but it can be any data that was generated by the shared adapter that it wants to send to the host.

At block 1110, the shared adapter stores the data in a RX queue. For example, the NIC can receive Ethernet packets that are then stored in RX data queues. The RX complete queue entries 340 discussed above can map locations of these packets in the RX data queues.

At block 1115, the stored adapter sets the bitmask in the interrupt register to indicate which RX queue has the data that was identified at block 1105. This was discussed above in FIG. 10 where the shared adapter can toggle a bit value (e.g., from 0 to 1) in the bitmask 1015 that corresponds to the RX data queue. That is, each bit in the bitmask 1015 can correspond to one of a plurality of RX data queues.

At block 1120, the stored adapter checks the interrupt state in the interrupt register (e.g., the interrupt state 1005 in FIG. 10) to determine whether the host should be interrupted. For example, if the interrupt state is "No Interrupt Required", then the method 1100 proceeds to block 1125 where the shared network adapter does not transmit the interrupt to the host. that is, the host may already be processing data in the RX data queue. In one embodiment, it is the host's responsibility to check to make sure the data in each RX data queue has been processed before it changes the interrupt state back to "Interrupt Required."

However, if the interrupt state is currently "Interrupt Required," the method instead proceeds to 1130 where the shared adapter transmits the interrupt to the host or the CP. This tells the host that data is stored in at least one RX data queue that should be processed by the host.

At block 1135, the shared adapter sets the interrupt state to indicate the host should not be interrupted—e.g., "No Interrupt Required". That is, if the shared adapter stores another Ethernet packet in a RX data queue before the host has changed the state, the shared adapter does not transmit another interrupt. That is, if the method 1100 repeats, at block 1120, the shared adapter would see that the interrupt state is still "No Interrupt Required" and the method 1100 proceeds to block 1125. In this manner, the shared adapter can continue to receive and store new packets without having to waste resources interrupting the host so long as the interrupt state remains in the "No Interrupt Required" state.

Note in one embodiment that block 1135 may be performed before block 1130 in to ensure proper serialization.

Figure 12:
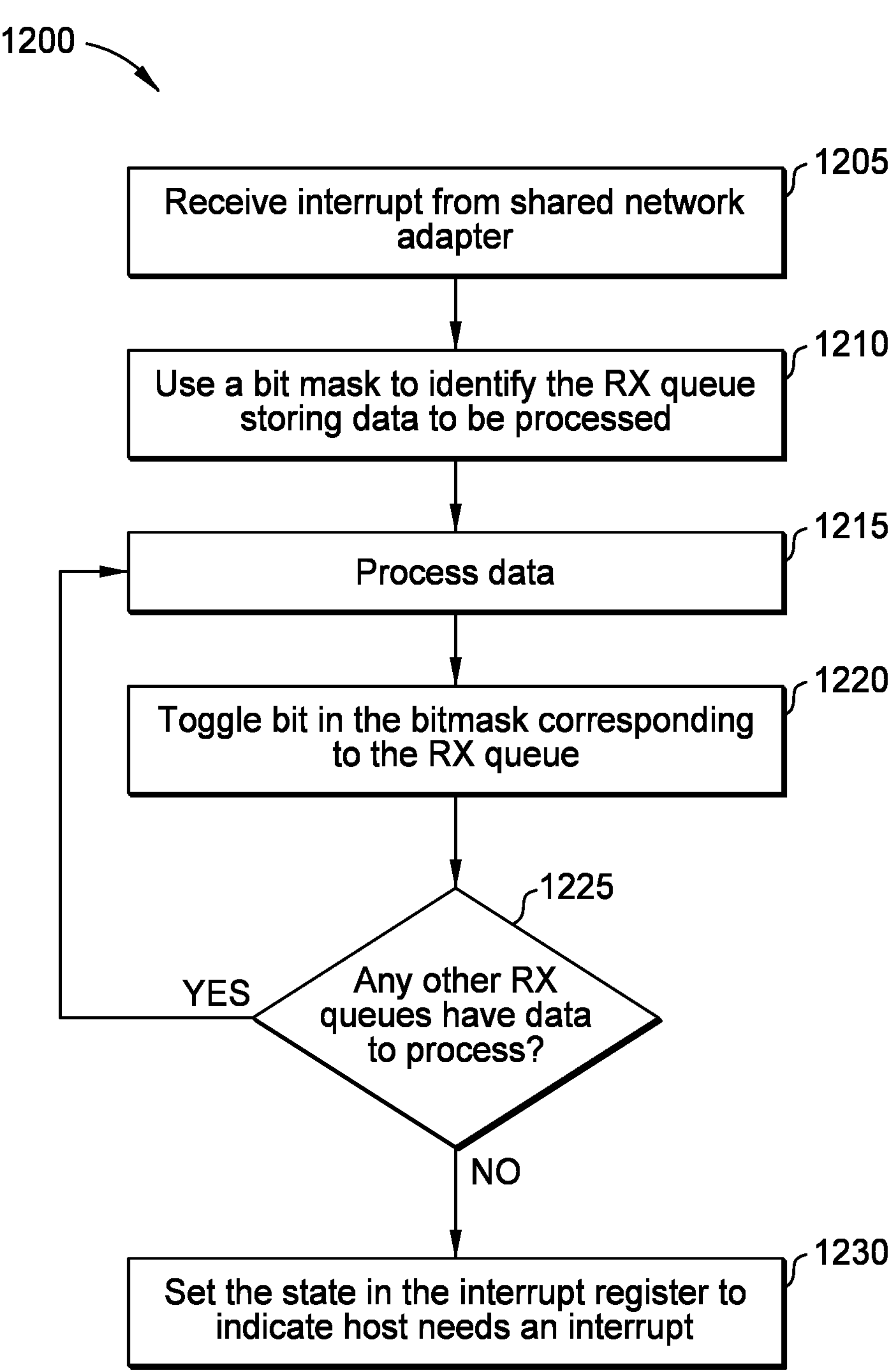
FIG. 12 illustrates a flowchart for processing multiple data chunks using one interrupt, according to one embodiment.

FIG. 12 illustrates a flowchart of a method 1200 for processing multiple data chunks using one interrupt, according to one embodiment. Unlike FIG. 11 which describes interrupt control from the perspective of the shared adapter, FIG. 12 describes interrupt control from the perspective of the host, e.g., the OS or the CP. At block 1205, the host receives an interrupt from the shared network adapter. The interrupt informs the host that new data has been stored in a RX data queue for the host to process.

In one embodiment, the host changes the interrupt to a third interrupt state to indicate it is currently processing data. For example, the host may change the interrupt state from "No Interrupt Required" to "No Interrupt Required-Processing" between blocks 1205 and 1210, indicating the host acknowledges to the shared adapter it received the interruption and is currently processing the queue.

At block 1210, the host uses the bitmask in the interrupt register (e.g., the register 345 in FIG. 10) to identify the RX data queue storing the data to be processed. The host can then retrieve the data from the RX queue.

At block 1215, the host processes the data. As discussed above, the data could be an Ethernet packet or frame, or any other data the shared network adapter wants to transmit to the host.

At block 1220, the host toggles the bit in the bitmask corresponding to the RX queue. This indicates the host has processed the data saved in the RX queue. In one embodiment, block 1220 is performed before block 1215 to ensure proper serialization.

At block 1225, the host determines whether any other RX queues have data to process. For example, while the host was processing the data in the first RX queue, the shared network adapter may have stored additional data in other RX queues. When doing so, the shared network adapter toggles the bit in the bitmask corresponding to the RX queues. Thus, at block 1225, the host can evaluate the bitmask to determine whether any of the bits have been toggled to a state indicating more data is ready to be processed by the host.

If the bitmask indicates more data is ready to be processed by the host, the method 1200 returns to block 1215. Notably, the host can process multiple packets that are stored at different times in RX queues without the shared network adapter having to transmit an interrupt for every packet.

If the bitmask indicates no more data is ready to be processed by the host, the method 1200 proceeds to block 1230 where the host sets the state of the interrupt register to indicate the host needs an interrupt the next time the shared network adapter stores data in the RX data queues. Put differently, the host has finished processing the data stored in the RX queues and can proceed to do other tasks. Thus, the shared network adapter will send an interrupt to the host next time it has data ready for the host to process.

Figure 13:
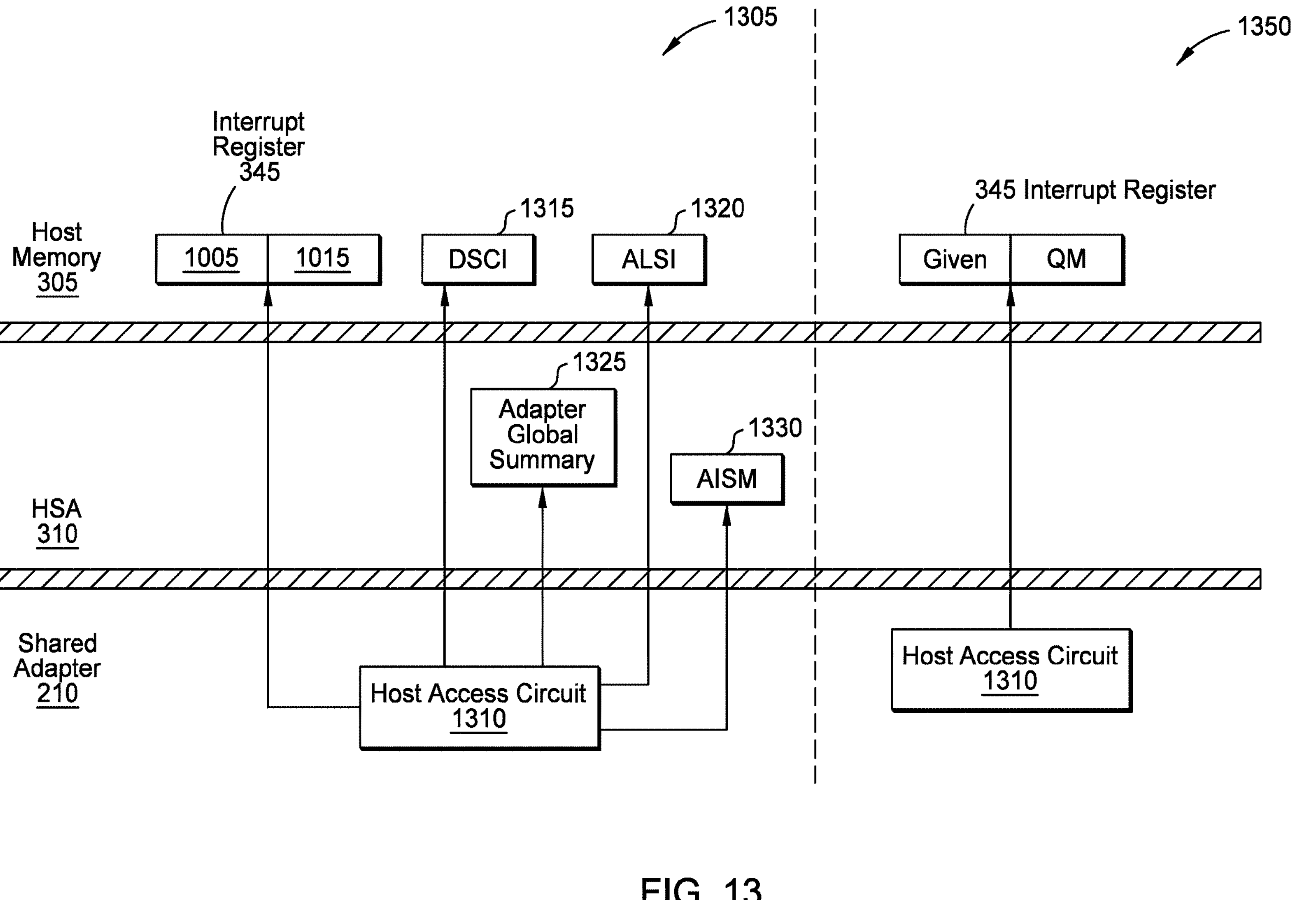
FIG. 13 illustrates a system for generating interrupts for a host operating system, according to one embodiment.

FIG. 13 illustrates a system for generating interrupts for a host OS, according to one embodiment. Specifically, portion 1305 of FIG. 13 indicates some of the actions of the system when the shared adapter 210 transmits an interrupt to the host, while portion 1350 of FIG. 13 indicates the actions of the system when the shared adapter 210 does not transmit an interrupt.

As shown, the shared adapter 210 includes a host access circuit 1310 which is circuitry in the shared adapter 210 that is tasked with accessing the host memory 305. When the shared adapter 210 has data in a RX queue ready for the host to process, the host access circuit 1310 checks the interrupt state 1005 in the interrupt register 345 to determine whether an interrupt should be sent. In the portion 1305, the interrupt state 1005 is in a state that indicates the shared adapter 210 should transmit an interrupt to the host.

FIG. 13 illustrates the host access circuit 1310 setting a device state change indicator (DSCI) 1315, an adapter local summary indicator (ALSI) 1320, an adapter global summary 1325, and an Adapter Interrupt Source Mask (AISM) 1330. The DSCI 1315 represents a specific device on the adapter with pending work, while the ALSI 1320 represents pending work on a specific adapter. For example, there may be multiple shared adapters in the computing system (e.g., Adapter 0, 1, 2, etc.) where each adapter has its own ALSI 1320 (e.g., ALSIs 0, 1, 2, etc.). Moreover, the shared adapters can have multiple data devices. As such, each ALSI 1320 can have multiple DSCIs 1315. The following table illustrates one example of Adapter Interrupt Facility (AIF) register devices:

TABLE 1

| Adapter | AIF Register Devices | | | | | | |
|---|---|---|---|---|---|---|---|
| ALSI 0 | DSCI 0 | DSCI 1 | DSCI 2 | DSCI 3 | DSCI 4 | DSCI 5 | DSCI x |
| ALSI 1 | DSCI 0 | DSCI 1 | | | | | |
| ALSI 2 | DSCI 0 | DSCI 1 | DSCI 2 | | | | |

Whenever an Adapter Interruption (AI) occurs, in one embodiment it is the OS's responsibility to determine which adapters and devices have pending work. Unlike a traditional subchannel I/O interruption, a single AI can indicate pending work across multiple adapters and devices with a single interruption.

When an AI occurs, a CP can start processing the array one row at a time. If the ALSI is equal to x'01' for a row, the adapter has one or more devices with pending work. The CP may be responsible to reset the ALSI for the adapter to zero to allow the detection of additional work arriving while processing each of the DSCIs associated with the adapter. The ALSI can be cleared with a serialized operation.

The CP then inspects each DSCI in the row to determine the devices with pending work. Each DSCI found with a value of x'01' has pending work. The CP sets the DSCI back to zero and kicks off a task to process the queues associated with the device. This processing repeats until each of the DSCIs and ALSIs is handled.

The host access circuit 1310 also sets the AISM 1330 to indicate the source of interruption. The AISM is a bit mask of all the possible adapter types which could generate an AI. The host access circuit 1310 sets the appropriate bit in the AISM indicating the source adapter type generating the interruption and the Adapter Global Summary 1325 is set to indicate there is pending work on one or more adapters.

In the portion 1350, the interrupt state 1005 is in a state that indicates the shared adapter 210 should not transmit an interrupt to the host. Thus, when the host access circuit 1310 checks the interrupt state 1005, it knows it does not have to send an interrupt, and as such, the portion 1350 does not include setting DSCI 1315, the ALSI 1320, the adapter global summary 1325, and the AISM 1330 since these are not used.

While the foregoing is directed to embodiments of the present invention, other and further embodiments of the invention may be devised without departing from the basic scope thereof, and the scope thereof is determined by the claims that follow.

What is claimed is:

1. A method comprising:

identifying, at a shared network adapter, data that should be processed by a host;

storing the data in one of a plurality of receive (RX) data queues in the shared network adapter, wherein the plurality of RX data queues facilitates data transfer between the shared network adapter and the host;

setting a bitmask to indicate which RX data queue of a plurality of RX data queues stores the data, wherein the bitmask indicates which RX data queues has data ready to be processed by the host;

checking an interrupt state corresponding to the host, wherein the interrupt state indicates a current data processing state of the host; and determining whether to transmit an interrupt to the host to process the data based on the interrupt state.

2. The method of claim 1, further comprising:

transmitting an interrupt from the shared network adapter to the host when the interrupt state indicates the host is not currently processing data stored in the plurality of RX data queues.

3. The method of claim 2, further comprising, after determining the interrupt state indicates the host is not currently processing data stored in the plurality of RX data queues:

changing the interrupt state to indicate the host is currently processing data stored in the plurality of RX data queues.

4. The method of claim 3, further comprising, after changing the interrupt state:

using, by the host, the bitmask to identify the RX data queue that stores the data;

processing the data;

toggling a bit in the bitmask to indicate the data in the RX data queue was processed; and evaluating the bitmask to determine whether any other bits in the bitmask indicate the shared network adapter has stored new data in one of the plurality of the RX data queues to be processed by the host.

5. The method of claim 4, further comprising, after determining that none of the other bits in the bitmask indicate the shared network adapter has stored new data in one of the plurality of the RX data queues:

changing the interrupt state to indicate that the host is not currently processing data stored in the plurality of RX data queues and requires an interruption for any new arriving data.

6. The method of claim 4, further comprising, after determining that at least one of the other bits in the bitmask indicate the shared network adapter has stored new data in one of the plurality of the RX data queues:

using, by the host, the bitmask to identify which one of the plurality of RX data queues stores the new data;

processing the new data, wherein, when processing the new data, the interrupt state remains in a state that indicates the host is currently processing data stored in the plurality of RX data queues; and toggling a bit in the bitmask to indicate the new data was processed.

7. The method of claim 1, wherein no interrupt is transmitted from the shared network adapter to the host when the interrupt state indicates the host is currently processing data stored in the plurality of RX data queues.

8. A system, comprising:

one or more processors configured to host a plurality of logical partitions or virtual machines;

a shared network adapter configured to provide an interface between the plurality of logical partitions or virtual machines and a network interface card (NIC); and wherein the shared network adapter is configured to:

identify data that should be processed by the host;

store the data in one of a plurality of receive (RX) data queues in the shared network adapter, wherein the plurality of RX data queues facilitates data transfer between the shared network adapter and the host;

set a bitmask to indicate which RX data queue of a plurality of RX data queues stores the data, wherein the bitmask indicates which RX data queues has data ready to be processed by the host;

check an interrupt state corresponding to the host, wherein the interrupt state indicates a current data processing state of the host; and determine whether to transmit an interrupt to the host to process the data based on the interrupt state.

9. The system of claim 8, wherein the shared network adapter is configured to:

transmit an interrupt from the shared network adapter to the host when the interrupt state indicates the host is not currently processing data stored in the plurality of RX data queues.

10. The system of claim 9, wherein the shared network adapter is configured to, after determining the interrupt state indicates the host is not currently processing data stored in the plurality of RX data queues:

change the interrupt state to indicate the host is currently processing data stored in the plurality of RX data queues.

11. The system of claim 10, wherein, the interrupt state is changed, the host is configured to:

use the bitmask to identify the RX data queue that stores the data;

process the data;

toggle a bit in the bitmask to indicate the data in the RX data queue was processed; and evaluate the bitmask to determine whether any other bits in the bitmask indicate the shared network adapter has stored new data in one of the plurality of the RX data queues to be processed by the host.

12. The system of claim 11, wherein, after determining that none of the other bits in the bitmask indicate the shared network adapter has stored new data in one of the plurality of the RX data queues, the host is configured to:

change the interrupt state to indicate that the host is not currently processing data stored in the plurality of RX data queues and requires an interruption for any new arriving data.

13. The system of claim 11, wherein, after determining that at least one of the other bits in the bitmask indicate the shared network adapter has stored new data in one of the plurality of the RX data queues, the host is configured to:

use the bitmask to identify which one of the plurality of RX data queues stores the new data;

process the new data, wherein, when processing the new data, the interrupt state remains in a state that indicates the host is currently processing data stored in the plurality of RX data queues; and toggle a bit in the bitmask to indicate the new data was processed.

14. The system of claim 8, wherein no interrupt is transmitted from the shared network adapter to the host when the interrupt state indicates the host is currently processing data stored in the plurality of RX data queues.

15. A computer program product comprising:

a computer readable storage medium having computer readable program code embodied therewith, the computer readable program code executable by one or more computer processors to perform an operation, the operation comprising:

identifying, at a shared network adapter, data that should be processed by a host;

storing the data in one of a plurality of receive (RX) data queues, wherein the plurality of RX data queues facilitates data transfer between the shared network adapter and the host;

setting a bitmask to indicate which RX data queue of a plurality of RX data queues stores the data;

checking an interrupt state corresponding to the host;

determining whether to transmit an interrupt to the host to process the data based on the interrupt state;

transmitting an interrupt from the shared network adapter to the host when the interrupt state indicates the host is not currently processing data stored in the plurality of RX data queues;

after determining the interrupt state indicates the host is not currently processing data stored in the plurality of RX data queues:

changing the interrupt state to indicate the host is currently processing data stored in the plurality of RX data queues; and after changing the interrupt state:

using, by the host, the bitmask to identify the RX data queue that stores the data;

processing the data;

toggling a bit in the bitmask to indicate the data in the RX data queue was processed; and evaluating the bitmask to determine whether any other bits in the bitmask indicate the shared network adapter has stored new data in one of the plurality of the RX data queues to be processed by the host.

16. The computer program product of claim 15, wherein the operation further comprises, after determining that none of the other bits in the bitmask indicate the shared network adapter has stored new data in one of the plurality of the RX data queues:

changing the interrupt state to indicate that the host is not currently processing data stored in the plurality of RX data queues and requires an interruption for any new arriving data.

17. The computer program product of claim 15, wherein the operation further comprises, after determining that at least one of the other bits in the bitmask indicate the shared network adapter has stored new data in one of the plurality of the RX data queues:

using, by the host, the bitmask to identify which one of the plurality of RX data queues stores the new data;

processing the new data, wherein, when processing the new data, the interrupt state remains in a state that indicates the host is currently processing data stored in the plurality of RX data queues; and toggling a bit in the bitmask to indicate the new data was processed.

* * * * *